(No Model.)
A. D. ELLIOTT.
FRICTION CLUTCH.
No. 548,528. Patented Oct. 22, 1895.
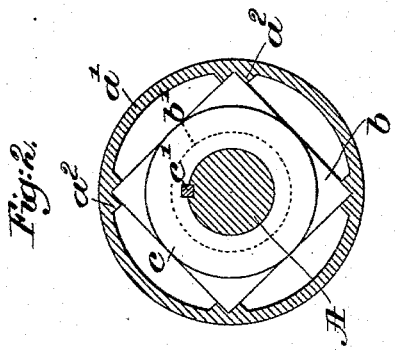
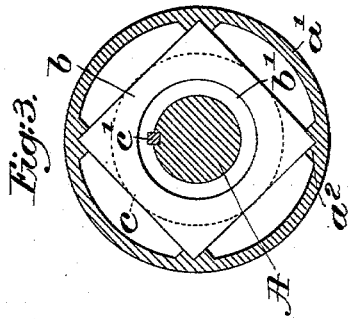
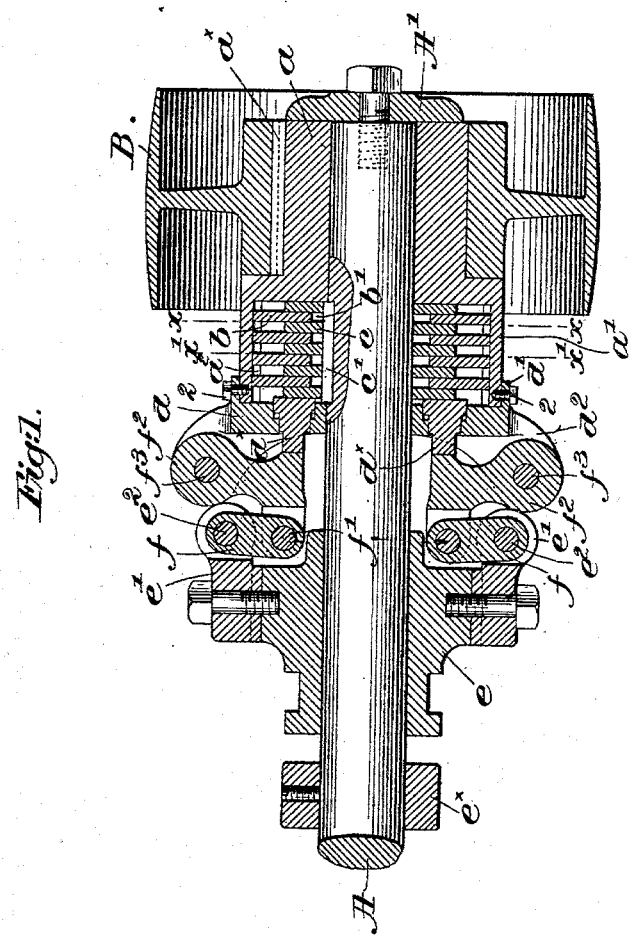
Witnesses.
Edward F. Allen
Thomas J. Drummond
Inventor:
Alvin D. Elliott
By Crosby Gregory. Attys.

UNITED STATES PATENT OFFICE.

ALVIN D. ELLIOTT, OF LAWRENCE, ASSIGNOR TO JAMES W. BROOKS, OF PETERSHAM, AND JOHN BROOKS, OF CAMBRIDGE, MASSACHUSETTS.

FRICTION-CLUTCH.

SPECIFICATION forming part of Letters Patent No. 548,528, dated October 22, 1895.

Application filed November 15, 1894. Serial No. 528,878. (No model.)

*To all whom it may concern:*

Be it known that I, ALVIN D. ELLIOTT, of Lawrence, county of Essex, State of Massachusetts, have invented an Improvement in Friction-Clutches, of which the following description, in connection with the accompanying drawings, is a specification, like letters and figures on the drawings representing like parts.

This invention has for its object the production of a novel and effective friction-clutch of simple construction and light weight, adapted to be locked in its clutched or unclutched position, means being provided for readily altering the amount of friction-surface between the driving and the driven members thereof.

In accordance therewith my invention consists in various details of construction, hereinafter described at length in the specification, and particularly pointed out in the claims.

Figure 1 is a longitudinal sectional view of a clutch embodying my invention, the supporting-shaft being shown in elevation and partly broken out. Fig. 2 is a transverse section thereof on the line $x\ x$, looking to the left; and Fig. 3, a similar view on the line, $x'\ x'$, looking in the same direction.

I have herein shown the clutch as mounted on a shaft A, supported in suitable bearings (not shown) and forming with the parts connected to rotate therewith one member of the clutch, the other member, also supported by the shaft, being normally loose on or with relation thereto. A hub $a$, mounted loosely on the shaft, is cored out at one end to form a holder $a'$ for a series of preferably flat plates $b$, shown in Figs. 2 and 3 as rectangular and seated in longitudinal grooved ribs $a^2$, formed on the interior of the holder, four of such ribs being herein shown, said plates having central openings $b'$ therein considerably larger than the shaft A. The plates are held in place in and to rotate with the hub $a$ by the ribs $a^2$, while free to be moved in the direction of the length of the shaft. Alternating with the plates $b$ is a series of preferably flat circular disks $c$, secured to the shaft A by a suitable spline or key $c'$, extended through a notch or seat in each disk to permit slight longitudinal movement on the shaft, the co-operating adjacent surfaces of the series of disks and plates being forced together at times by mechanism to be described.

I have shown as loosely mounted upon the shaft A an annular support $d$ and usual yoke-collar $e$, the support having a flange $d'$ overlapping the outer end of the holder $a'$ and secured thereto in suitable manner, as by bolts 2, the spline $c'$ between the hub $a$ and support $d$ preventing their longitudinal movement, assisted by a cap-plate A', bolted to the end of the shaft. Ears $e'$, secured to or forming a part of the yoke-collar $e$, pivotally support at $e^2$ short links $f$, jointed at $f'$ to clutch-actuators $f^2$, (shown as rocker-arms,) adapted to swing or rock about their supports $f^3$ in ears or lugs $d^2$ on the annular support or collar $d$, as clearly shown in Fig. 1, the pivotal point $e^2$ being always at one side of a line passing through the joint $f'$ and the pivotal point $f^3$, and when the point $e^2$ is substantially in a line normal to the shaft and passing through the joint $f'$ the rocker-arm $f^2$ is locked from movement and no longitudinal strain is exerted upon the shaft. Each rocker is shaped to bear on the projecting end of a headed stud $d^\times$, having slight longitudinal movement in a seat in the collar or support $d$, the heads of the studs impinging against the adjacent surface of the outermost disk of the series.

The clutch members are brought into operative engagement by moving the yoke-collar $e$ into the position shown in Fig. 1 by the usual shifter, (not shown,) such movement through the links $f$ causing the rocker-arms $f^2$ to swing in toward the collar $d$ and thereby force the headed studs $d^\times$ against the adjacent disk to crowd the alternating series of plates $b$ and disks $c$ tightly together to rotate by their surface friction in unison with the shaft A. As the pivotal points $e^2$ are then substantially in the normal line of the shaft passing through the joints $f'$, the actuators, $f^2$ are locked, and it is impossible for them to swing away accidentally from the studs $d^\times$ and so diminish the friction between the friction disks and plates. At such time there is no pressure exerted by the action of the toggles upon the yoke $e$, and consequently the shaft is relieved from longitudinal strain when the clutch is operative. Movement of the yoke-collar $e$ to the left, Fig. 1, toward the stop-collar $e^\times$ opens the toggles and swings the rocker-arms $f^2$ away from the studs $d^\times$, so that the pressure on the friction disks and plates is diminished sufficiently to permit the series of disks to rotate without the series of plates. As the joints $f'$ of the toggles then occupy a position between the supporting-joints, the actuators $f^2$ cannot swing into operative position to bring the friction disks and plates into engagement unless positively moved by the yoke-collar.

A belt-pulley B is splined to the hub $a$ at $a^\times$, Fig. 1, to rotate therewith, though it is evident that the hub $a$ and its hollow holder $a'$ may be made integral with the pulley, if desired.

From the foregoing description it will be obvious that herein the pulley B, hub $a$, and friction-plates $b$ form one member of the clutch, the shaft A and disks $c$, secured thereto, forming the other member, either of which may be the driving or the driven member, as desired.

The studs $d^\times$, their actuators $f^2$, and their operating-toggles, with the yoke-collar $e$, form the clutch-operating mechanism to cause engagement or disengagement of the clutch members by means of the friction disks and plates.

By increasing or decreasing the number of friction disks and plates the power of the clutch is increased or diminished, the friction-surface varying with the number of disks and plates, so that the clutch is readily adjustable for different classes of work. The plates $b$, however, must be sufficient in number and strength to form a rigid connection when in operation between the disks $c$ and the holder $a'$ and its attached parts.

I claim—

1. In a friction clutch, a driving member and its shaft, and a member to be driven, and a series of alternating friction surfaces rotatable with each, combined with rocking arms pivoted to one of said members, to press the two series of friction surfaces together, a sliding collar on the shaft, and links pivoted thereto and to the rocking arms, movement of the collar to place the links substantially normal to the axis of rotation of the clutch locking the rocking arms from movement, substantially as described.

2. In a friction clutch, a shaft, a series of friction disks longitudinally movable on and rotatable with the shaft; a hub loosely mounted on the shaft and provided with a holder; a series of longitudinally movable friction plates in and rotatable with the holder and alternating with the disks; a support secured to the holder, and rocking arms pivoted to the support to press said disks and plates together, combined with a collar adapted to slide on the shaft, and links pivoted thereto and to the rocking arms, movement of the collar to place the links substantially normal to the shaft locking the rocking arms from movement, substantially as described.

In testimony whereof I have signed my name to this specification in the presence of two subscribing witnesses.

ALVIN D. ELLIOTT.

Witnesses:
ADELBERT E. ELLIS,
WILBUR E. ROWELL.